United States Patent

Ohmori et al.

[11] Patent Number: 4,720,428
[45] Date of Patent: Jan. 19, 1988

[54] CLADDING MATERIALS FOR OPTICAL FIBERS

[75] Inventors: Akira Ohmori, Ibaraki; Nobuyuki Tomihashi, Takatsuki; Takahiro Kitahara, Settsu, all of Japan

[73] Assignee: Daikin Kogyo Co., Ltd., Osaka, Japan

[21] Appl. No.: 735,648

[22] Filed: May 20, 1985

[30] Foreign Application Priority Data

May 28, 1984 [JP] Japan ................... 59-107971

[51] Int. Cl.⁴ .................... D02G 3/00; G02B 6/00
[52] U.S. Cl. ................... 428/373; 428/375; 428/392; 428/394; 428/421; 350/96.34
[58] Field of Search .......... 350/96.34; 428/373, 428/394, 392, 421

[56] References Cited

U.S. PATENT DOCUMENTS

| | | | |
|---|---|---|---|
| 3,993,834 | 11/1976 | Chimura et al. | 350/96.34 |
| 4,138,194 | 2/1979 | Beasley et al. | 350/96.30 |
| 4,365,049 | 12/1982 | Tsunoda et al. | 526/245 |
| 4,381,269 | 4/1983 | Kaino et al. | 428/373 |
| 4,511,209 | 4/1985 | Skutnik | 350/96.34 |
| 4,544,235 | 10/1985 | Nishida et al. | 526/245 |
| 4,557,562 | 12/1985 | Ohmori et al. | 526/245 |
| 4,576,438 | 3/1986 | Tatsukami et al. | 428/394 |
| 4,615,584 | 10/1986 | Ohmori et al. | 350/96.30 |

FOREIGN PATENT DOCUMENTS

128517 12/1984 European Pat. Off. ......... 350/96.34

*Primary Examiner*—George F. Lesmes
*Assistant Examiner*—S. A. Gibson
*Attorney, Agent, or Firm*—Larson and Taylor

[57] ABSTRACT

This invention provides a cladding material for an optical fiber, said cladding material having a structural unit represented by the formula

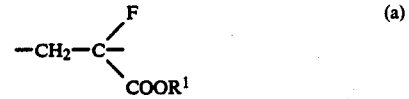

wherein $R^1$ represents chain hydrocarbon group having 1 to 5 carbon atoms or cyclic hydrocarbon group having 3 to 6 carbon atoms and optionally substituted with lower alkyl group having 1 to 6 carbon atoms.

2 Claims, No Drawings

CLADDING MATERIALS FOR OPTICAL FIBERS

This invention relates to plastics-type cladding materials for optical fibers.

Optical fibers are well known in the art which comprise a core of synthetic high polymer having high transparency such as polystyrene, polymethyl methacrylate and the like, and a cladding of synthetic high polymer having a lower refractive index than that of the core, the core being concentrically surrounded with the cladding to form a composite fiber. In these optical fibers, a ray of light applied at one end thereof is transmitted by total internal reflections along a length of the filament.

Generally fluoroalkyl methacrylate polymer and the like are used as a plastics-type cladding material for optical fibers. However, these polymers have the drawbacks of being low in softening temperature (up to 110° C.) and in decomposition temperature (up to 260° C.).

When an optical fiber with a core of low softening temperature is installed, for example, in the vicinity of the engine in a vehicle, the heat released from the engine readily softens the core to the uneven mutation of the refractive index of the core, causing marked scattering of light through the filament and seriously reducing the light transmitting efficiency of the fiber. Further if the polymer of the core has a low decomposition temperature, extreme difficulty is encountered in adjusting the melting temperature of the polymer to avoid the decomposition thereof in melting the polymer for spinning.

It is an object of this invention to provide plastics-type cladding materials for optical fibers free of the foregoing drawbacks, i.e. having a high softening temperature and a high decomposition temperature.

The object of this invention can be achieved by using as a cladding material for an optical fiber a polymer having at least 5% of a structural unit represented by the formula

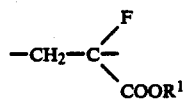

wherein $R^1$ represents chain hydrocarbon group having 1 to 5 carbon atoms or cyclic hydrocarbon group having 3 to 6 carbon atoms and optionally substituted with lower alkyl group having 1 to 6 carbon atoms.

The foregoing polymer may be either a homopolymer having a structural unit of the formula (a) or a copolymer having a structural unit of the formula (a) and a structural unit represented by the formula

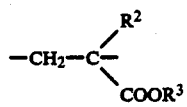

wherein $R^2$ represent hydrogen atom or chain hydrocarbon group having 1 to 5 carbon atoms, and $R^3$ represents hydrogen atom, chain hydrocarbon group having 1 to 5 carbon atoms and optionally containing fluorine or cyclic hydrocarbon group having 3 to 6 carbon atoms, optionally containing fluorine and optionally substituted with lower alkyl group having 1 to 6 carbon atoms, The term polymer having the structural unit of the formula (a) is used throughout the specification and claims to include not only a homopolymer comprising structural units of the formula (a) in which the substituent $R^1$ is the same but also a copolymer comprising structural units of the formula (a) in which the substituent $R^1$ may be different.

The substituents $R^1$, $R^2$ and $R^3$ in the copolymer comprising structural units (a) and (b) are the same or different as in the polymer having the structural unit of the formula (a).

The polymer for use in preparing the cladding material of this invention for optical fibers can be produced by polymerizing a monomer represented by the formula

wherein $R^1$ is as defined above or copolymerizing the monomer of the formula (c) with a monomer represented by the formula

wherein $R^2$ and $R^3$ are as defined above.

The present invention provides an optical fiber comprising a cladding and a core wherein the cladding comprises a polymer having a structural unit represented by the formula

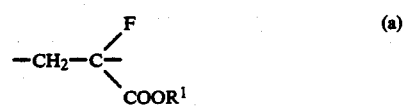

wherein $R^1$ represents chain hydrocarbon group having 1 to 5 carbon atoms or cyclic hydrocarbon group having 3 to 6 carbon atoms and optionally substituted with lower alkyl group having 1 to 6 carbon atoms and also an optical fiber comprising a cladding and a core wherein the cladding comprises a polymer comprising (i) at least 5 mole % of a structural unit represented by the formula

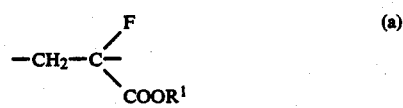

wherein $R^1$ represents chain hydrocarbon group having 1 to 5 carbon atoms or cyclic hydrocarbon group having 3 to 6 carbon atoms and optionally substituted with lower alkyl group having 1 to 6 carbon atoms and
(ii) up to 95 mole % of a structural unit represented by the formula

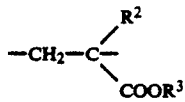

wherein $R^2$ represent hydrogen atom or chain hydrocarbon group having 1 to 5 carbon atoms, and $R^3$ represents hydrogen atom, chain hydrocarbon group having 1 to 5 carbon atoms and optionally containing fluorine or cyclic hydrocarbon group having 3 to 6 carbon atoms, optionally containing fluorine and optionally substituted with lower alkyl group having 1 to 6 carbon atoms.

The monomer which can be used as the material for preparing the polymer serving as the present cladding material, e.g., methyl-α-fluoroacrylate, can be synthesized by reacting methyl monofluoroacetate with dimethyl oxalate in diethyl ether in the presence of sodium hydride to form methyl methoxyallylfluoroacetate, condensing the acetate with para-formaldehyde and reacting the product with sodium methylate.

In preparing the copolymer by copolymerizing the monomers (c) and (d), 0 to 20 moles, preferably 0 to 5 moles, of the monomer (d) is used per mole of the monomer (c).

Further these monomers can be copolymerized with other comonomers such as styrene and vinyl chloride insofar as the comonomer used does not impair the properties of the resulting copolymer to be used as the present cladding material.

The polymer of this invention can be prepared by usual polymerization methods such as block, solution, suspension or emulsion polymerization methods.

Polymerization initiators useful for preparing polymers as the present cladding material are azo compounds or organic peroxides in solution or suspension polymerization, such as azobisisobutyronitrile, isobutyryl peroxide, octanoyl peroxide, di-iso-propylperoxy dicarbonate, fluorine-containing organic peroxides of the formulae $[Cl(CF_2CFCl)_2CF_2COO]_2$, $[H(CF_2CF_2)_3COO]_2$ and $(ClCF_2CF_2COO)_2$. Initiators useful for emulsion polymerization are redox initiators consisting of oxidizing agents such as ammonium persulfate, potassium persulate and like persulfates and reducing agents such as sodium sulfite, iron (III) sulfate and like salts of transition metals. In block, solution or suspension polymerization, it is preferred to use mercaptan or like chain transfer agents in order to give a polymer having a higher thermal decomposition temperature or to adjust the molecular weight of the polymer. Usually 0.01 to 5 parts by weight of the chain transfer agent is used per 100 parts by weight of the monomers (c) and (d) in their combined amount.

Examples of media useful in solution or suspension polymerization are fluorine compounds such as $CCl_2F_2$, $CCl_2FCClF_2$, $CClF_2CClF_2$ and

and hydrocarbon compounds such as butyl acetate and methyl isobutyl ketone.

The polymerization temperature is usually in the range of 0° to 100° C., preferably 10° to 80° C. in most cases although determined in consideration of the decomposition temperature of the polymerization initiator used.

The pressure employed for polymerization is in the range of 0 to 50 kg/cm² gauge. The polymer prepared by the foregoing polymerization for use as the present cladding material has a molecular weight ranging from usually 200,000 to 5,000,000 as determined by gel permeation chromatography, a refractive index of 1.45 to 1.49 and a softening temperature of 80° to 140° C.

In preparing optical fibers, the cladding material of this invention is used in combination with a core material which is higher by at least 3% in refractive index than the cladding. Examples of core materials surrounded with the present cladding materials are glass, polystyrene, polycarbonate, polyphenyl methacrylate, polycyclohexyl methacrylate, poly-3,3,5-trimethylcyclohexyl methacrylate, polyphenyl-α-fluoromethacrylate, etc. to which the useful core materials are not limited.

The plastics-type cladding material of this invention has a higher softening temperature than that of fluoroalkyl methacrylate polymer commonly used as the plastics-type cladding material in the art and can be used at relatively high temperatures, for example even in the vicinity of the engine in an automobile. Moreover, since the present cladding materials have a high decomposition temperature, the present material can be heated to a broader range of temperature when melted and spun into a yarn to prepare an optical fiber, and therefore facilitates the adjustment of the temperature for melting the polymer.

The present invention will be described below in more detail with reference to the following examples and comparative example.

EXAMPLES 1 TO 6

Block polymerization was carried out at 70° C. for 6 hours with use of 100 parts by weight of methyl-α-fluoroacrylate, 0.05 part by weight of azobisisobutyronitrile and 0.3 part by weight of n-dodecylmercaptan to prepare a polymer useful as the cladding material of the present invention.

An optical fiber, 300 μm in diameter and 15 μm in the thickness of the cladding, was spun at 230° C. with use of the polymer obtained above as a cladding material and one of the polymers shown below in Table 1 as a core material. The transmittance (%) per a 500-mm length of the optical fiber was measured with light rays 650 to 680 nm in wavelength with the results as shown in Table 1 below. The softening temperature (Tg, °C.), refractive index ($n_D$) and melt index (MI, g) of the polymers indicated in Table 1 below were measured by the following methods.

Softening temperature (Tg)

Using a differential scanning calorimeter (Model DSC II, product of Perkin Elemer Co.), the temperature at which the polymer started to absorb heat was measured while elevating the temperature at a rate of 20° C./min.

Refractive index ($n_D$)

Measured at 25° C. with Abbe refractometer (product of Atago Kogakukiki Mfg. Co., Ltd.).

Melt index (MI)

A Koka flow tester, manufactured by Shimazu Seisakusho, Ltd., was used. The polymer was placed into a cylinder having an inside diameter of 9.5 mm, maintained at 230° C. for 5 minutes and then extruded through an orifice, 8 mm in length and 2.1 mm in inside diameter, under a piston load of 7 kg. The amount in gram of the polymer extruded for a period of 10 minutes was measured.

TABLE 1

| | Core | | | | Optical fiber |
|---|---|---|---|---|---|
| | Kind of polymer | Tg (°C.) | $n_D$ | MI | Transmittance (%) |
| Example 1 | Polycarbonate | 122 | 1.59 | 73 | 73 |
| Example 2 | Polystyrene | 80 | 1.60 | 42 | 63 |
| Example 3 | Polyphenyl methacrylate | 120 | 1.57 | 38 | 67 |
| Example 4 | Polycyclohexyl methacrylate | 105 | 1.51 | 60 | 58 |
| Example 5 | Poly-3,3,5-trimethylcyclohexyl methacrylate | 140 | " | 28 | 57 |
| Example 6 | Poly-α-fluorophenyl acrylate | 160 | 1.56 | 78 | 62 |

(Note: Tg, $n_D$ and MI of the polymer as cladding used conjointly with the foregoing polymers as cores were 138, 1.46 and 46, respectively).

EXAMPLES 7 TO 11

Five kinds of polymers useful as cladding materials were prepared in the same manner as in Examples 1 to 6 with the exception of using α-fluoroacrylate shown below in Table 2 in place of methyl-α-fluoroacrylate.

Five kinds of optical fibers were produced by the same procedure as in Examples 1 to 6 from the polymers obtained above as a cladding material and the same kind of polycarbonate used in Example 1 as a core material. The transmittance of the optical fibers thus prepared was measured with the results as indicated below in Table 2.

TABLE 2

| | Cladding | | | | Optical fiber |
|---|---|---|---|---|---|
| | α-Fluoro-acrylate | Tg (°C.) | $n_D$ | MI | Transmittance (%) |
| Example 7 | Methyl | 138 | 1.46 | 46 | 73 |
| Example 8 | Cyclohexyl | 130 | 1.49 | 52 | 64 |
| Example 9 | t-Butyl | 129 | 1.46 | 23 | 74 |
| Example 10 | 3,3-Dimethyl-2-butyl | 143 | 1.47 | 68 | 77 |
| Example 11 | Neopentyl | 136 | 1.46 | 60 | 72 |

(Note: The α-fluoroacrylate ($CH_2$≡C$\diagup^F_{COOR^1}$) is represented above in the table by only the $R^1$ group in the acrylate. Tg, $n_D$ and MI have the same meanings as above.)

The optical fibers prepared in Examples 1 to 11 were left to stand at 100° C. for 100 hours with the transmittance thereof unchanged.

COMPARATIVE EXAMPLE

An optical fiber was produced in the same manner as in Examples 1 to 6 from polypentafluoropropyl methacrylate (Tg=73° C., $n_D$=1.39, MI=24 g) as a cladding material and the same kind of polycarbonate as used in Example 1 as a core material. The transmittance of the optical fiber as measured was 69%. When allowed to stand at 100° C. for 100 hours, the optical fiber had the cladding contracted and exhibited a lower transmittance of 32%.

We claim:

1. In an optical fiber comprising a cladding and a polymeric core having high transparency, the improvement wherein said cladding comprises a polymer having a structural unit represented by the formula

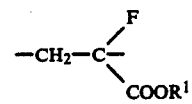

(a)

wherein $R^1$ represents chain hydrocarbon group having 1 to 5 carbon atoms or cyclic hydrocarbon group having 3 to 6 carbon atoms and optionally substituted with lower alkyl group having 1 to 6 carbon atoms.

2. In an optical fiber comprising a cladding and a polymeric core having high transparency, the improvement wherein said cladding comprises a polymer comprising
   (i) at least 5 mole % of a structural unit represented by the formula

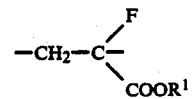

(a)

wherein $R^1$ represents chain hydrocarbon group having 1 to 5 carbon atoms or cyclic hydrocarbon group having 3 to 6 carbon atoms and optionally substituted with lower alkyl group having 1 to 6 carbon atoms and
   (ii) up to 95 mole % of a structural unit represented by the formula

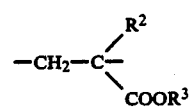

(b)

wherein $R^2$ represent hydrogen atom or chain hydrocarbon group having 1 to 5 carbon atoms, and $R^3$ represents hydrogen atoms, chain hydrocarbon group having 1 to 5 carbon atoms and optionally containing fluorine or cyclic hydrocarbon group having 3 to 6 carbon atoms, optionally containing fluorine and optionally substituted with lower alkyl group having 1 to 6 carbon atoms.

* * * * *